United States Patent
Kim

(10) Patent No.: US 10,305,902 B2
(45) Date of Patent: May 28, 2019

(54) TWO-CHANNEL AUTHENTICATION PROXY SYSTEM CAPABLE OF DETECTING APPLICATION TAMPERING AND METHOD THEREFOR

(71) Applicant: Juhan Kim, Bucheon-si (KR)

(72) Inventor: Juhan Kim, Bucheon-si (KR)

( * ) Notice: Subject to any disclaimer, the term of this patent is extended or adjusted under 35 U.S.C. 154(b) by 0 days.

(21) Appl. No.: 16/076,699

(22) PCT Filed: Jun. 19, 2017

(86) PCT No.: PCT/KR2017/006406
§ 371 (c)(1),
(2) Date: Aug. 9, 2018

(87) PCT Pub. No.: WO2018/012747
PCT Pub. Date: Jan. 18, 2018

(65) Prior Publication Data
US 2019/0044943 A1    Feb. 7, 2019

(30) Foreign Application Priority Data

Jul. 12, 2016 (KR) .................. 10-2016-0088062

(51) Int. Cl.
*H04L 29/06* (2006.01)
*G06F 21/44* (2013.01)
*H04L 9/08* (2006.01)
*H04L 9/32* (2006.01)
(Continued)

(52) U.S. Cl.
CPC ........ *H04L 63/0884* (2013.01); *G06F 21/316* (2013.01); *G06F 21/44* (2013.01);
(Continued)

(58) Field of Classification Search
CPC ............ H04L 63/0884; H04L 63/0281; G06F 21/316; G06F 21/46
(Continued)

(56) References Cited

U.S. PATENT DOCUMENTS 1,039,001 A * 9/1912 Winkler ................ A01M 23/30
43/83.5
8,595,810 B1 * 11/2013 Ben Ayed ........... H04L 63/0815
713/168
(Continued)

FOREIGN PATENT DOCUMENTS

JP    2009-043042 A    2/2009
JP    2012-080269 A    4/2012
(Continued)

OTHER PUBLICATIONS

International Search Report for PCT/KR2017/006406 dated Sep. 15, 2017 from Korean Intellectual Property Office.

*Primary Examiner* — Dant B Shaifer Harriman
(74) *Attorney, Agent, or Firm* — Revolution IP, PLLC

(57) ABSTRACT

The present invention relates to a two-channel authentication proxy system capable of detecting application tampering, and a method therefor, and provides a method for detecting tampering of an authentication application installed on a mobile terminal, and an authentication proxy system, which performs two-channel device authentication in an authentication proxy server by using a mobile terminal, without individual authentication, by a user, in N (N≥1) number of sites, relays the result thereof to a site to be authenticated, and enables repudiation to be prevented by leaving a relay record.

21 Claims, 11 Drawing Sheets

(51) Int. Cl.
*G06F 21/31* (2013.01)
*G06F 21/46* (2013.01)

(52) U.S. Cl.
CPC ............... *G06F 21/46* (2013.01); *H04L 9/08* (2013.01); *H04L 9/32* (2013.01); *H04L 63/0281* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 8,601,599 | B2* | 12/2013 | Park | G06F 21/54 |
| | | | | 713/159 |
| 9,792,458 | B2* | 10/2017 | Florez | G06F 21/6263 |
| 9,898,734 | B2* | 2/2018 | Ren | G06Q 20/3226 |
| 9,906,525 | B1* | 2/2018 | Avetisov | H04L 63/0861 |
| 9,961,048 | B2* | 5/2018 | Poffenbarger | H04L 63/0428 |
| 10,003,595 | B2* | 6/2018 | Woo | H04L 63/0838 |
| 2010/0185868 | A1* | 7/2010 | Grecia | H04L 9/3234 |
| | | | | 713/176 |
| 2014/0058951 | A1* | 2/2014 | Kuppuswamy | G06Q 20/223 |
| | | | | 705/67 |
| 2016/0219060 | A1* | 7/2016 | Karunakaran | G06F 21/33 |
| 2016/0350750 | A1 | 12/2016 | Kim | |

FOREIGN PATENT DOCUMENTS

| | | |
|---|---|---|
| KR | 10-1294805 B1 | 8/2013 |
| KR | 10-2013-0112786 A | 10/2013 |
| KR | 10-2015-0053663 A | 5/2015 |

* cited by examiner

FIG. 9

Authentication result data format

| result code | user name | website name | symmetric-key encrypted data (one-time app ID) |
|---|---|---|---|

Netkey processing result

To Hongikincan,

Authentication was processed normally by electronic and informational occupation association corp.

Example of terminal information table (291)

| terminal ID No. | phone No. | user ID | one-time app ID | app password |
|---|---|---|---|---|
| term_id_001 | xxx-xxxx-xxxx | user_001 | ot_app_id_001 | app_passwd_01 |
| term_id_002 | xxx-xxxx-xxxx | user_002 | ot_app_id_002 | app_passwd_02 |
| ... | ... | ... | ... | ... |
| term_id_00N | xxx-xxxx-xxxx | user_00N | ot_app_id_00N | app_passwd_0N |

FIG. 11

Example of affiliated store information table (292)

| store ID | store name | URL | authentication level | age limit for access | encryption key for access |
|---|---|---|---|---|---|
| shop01 | store name 1 | http://www.shop01.com | 0 | All (0) | access_key_01 |
| shop02 | store name 2 | http://www.shop02.com | 1 | more than fifteen | access_key_02 |
| ... | ... | ... | ... | ... | ... |
| shop0N | store name N | http://www.shop0N.com | 1 | more than nineteen | access_key_0N |

Example of user information table

| user ID | user name | birthdate | phone number | email | address |
|---|---|---|---|---|---|
| user_001 | user name 1 | yyyymmdd | xxx-xxxx-xxxx | aa@xx01.com | address 1 |
| user_002 | user name 2 | yyyymmdd | xxx-xxxx-xxxx | bb@xx02.com | address 2 |
| ... | ... | ... | ... | ... | ... |
| user_00N | user name N | yyyymmdd | xxx-xxxx-xxxx | nn@xx0N.com | address N |

FIG. 14

Example of repudiation-preventing relay log (294)

| token issuer ID | processed token | authentication result | user ID | token processing time stamp |
|---|---|---|---|---|
| shop01 | token_id001 | success in joining | user_001 | yyyymmdd hhmiss |
| shop02 | token_id002 | success in logging | user_002 | yyyymmdd hhmiss |
| ... | ... | ... | ... | ... |
| shop0N | token_id00N | success in settlement | user_00N | yyyymmdd hhmiss |

TWO-CHANNEL AUTHENTICATION PROXY SYSTEM CAPABLE OF DETECTING APPLICATION TAMPERING AND METHOD THEREFOR

TECHNICAL FIELD

The present invention relates to a two-channel authentication proxy system and method for detecting application (app) tampering in which a mobile terminal is used as an authentication tool.

More particularly, the present invention relates to a method of detecting tampering of a specific application installed on a mobile terminal which is used as an authentication tool, and an authentication proxy system and method in which a reliable authentication proxy server authenticates N (N≥1) websites by using a mobile terminal without performing individual authentication and the results are relayed to a registered website requiring authentication.

BACKGROUND ART

Due to the proliferation of smart phones, it is possible to easily install applications (apps) on smart phones. An owner of a smart phone can be specified through mobile terminal device information of a smart phone on which an app is installed. In this way, authentication for specifying a user is possible through only device authentication without inputting an identification (ID)/password.

However, after acquiring an app development source, it is possible to tamper the app and reinstall (repackage) the tampered app. To prevent app tampering, app stores recommend developers to obfuscate sources before releasing apps.

Also, a mobile banking app is being widespread, and various kinds of important information such as authentication information for banking may be leaked when a tampering app is executed. Therefore, there is a technology for verifying integrity of an app in conjunction with a tampering detection server when the app is executed.

Meanwhile, as a technology regarding an application for providing authentication, joining, and payment services using a mobile communication terminal, Korean Unexamined Patent Publication No. 10-2013-0112786 "Application for Authentication, Membership Registration, and Payment Services Based on Mobile Communication Terminal (Kim Juhan)" (Literature 1) discloses a technology for acquiring data through a quick response (QR) code or near field communication (NFC) with an app installed on a mobile terminal and transferring data of an agreed format by running an authentication app or transferring the data of the agreed format (see FIG. 7) by running an authentication app in a mobile web browser of the mobile terminal when the acquired data is the data of the agreed format such that authentication, joining, and payment may be performed in a client terminal without inputting any ID or password.

However, an app installed on a smart phone may be analyzed through reverse engineering (decompiling), and then a source code thereof may be extracted. Even when source codes are obfuscated, it is not possible to ensure that obfuscation technology is always perfect, and it is likely that a source code will be leaked by an internal developer. When a source code is analyzed, a parameter type transferred to an authentication proxy server and an encryption algorithm may be obtained. Therefore, it is possible to set and encrypt fake data in a parameter and transfer the fake data to the authentication proxy server.

Also, in some mobile operating systems (OSs), it is possible to collect device information of app users through an app.

A malicious attacker acquires a password and device information of a person who is a target for an attack and then installs a tampered app whose parameter can be tampered on a smart phone of the attacker. Subsequently, collected device information is set in a parameter, and authentication is attempted, such that the malicious attacker may be authenticated with the set device information by an authentication proxy server.

The mobile banking app requires a separate tampering detection system because it is necessary to check integrity of the app in conjunction with a tampering detection server immediately after the app is executed. However, if possible, it would be better to detect tampering of apps without a separate tampering detection system.

DISCLOSURE

Technical Problem

The present invention is directed to providing a mobile application (app) tampering detection method in which an authentication attempt for a malicious purpose is blocked by authenticating a device and checking the authenticity of an app installed on the device even when an attacker having a malicious purpose acquires an app source, creates and installs a fake app whose parameter can be tampered, acquires device information and authentication information required for authentication, and attempts authentication.

The present invention is also directed to providing an authentication proxy system for preventing damage from a phishing/pharming website, which is a webpage created to be so delicate that it is difficult to distinguish between truth and falsehood with the naked eye by an attacker having a malicious purpose to induce access, by blocking a user's access to unregistered websites.

The present invention is also directed to providing an authentication proxy system for fundamentally preventing joining or login (authentication) to an age-limited website, which limits access according to age, when a user of a mobile terminal is underage on the basis of the user's birthdate.

The present invention is also directed to providing an authentication proxy system in which a reliable third-party organization performs authentication by proxy and keeps authentication records, when an authentication-related conflict occurs, a person who makes an authentication request cannot deny that the authentication request has not been made by himself or herself because data tracking is possible, and it is possible to prevent repudiation by preventing a man-in-the-middle (MITM) attack and a replay attack in a network.

Technical Solution

One aspect of the present invention provides an authentication proxy system using a mobile terminal, the system including, in order to register a device and an authentication application (app) of a mobile terminal 100 whose identity has been verified: a client terminal 10 of an authentication proxy server 200 configured to receive key inputs of a phone number of the mobile terminal 100 and an app password for check and apply for use of an authentication app 110; the authentication proxy server 200 including an authentication app usage acceptance unit 205 configured to register the phone number of the mobile terminal 100 and the app password in a terminal information table 291 in response to the application for use of the authentication app 110 from the client terminal 10, and a terminal information registration unit 206 configured to issue a one-time app identification (ID) and register terminal information when the terminal information and the app password for check are received due to access of the mobile terminal 100; and the mobile terminal 100 having the authentication app 110 configured to be executed and approved for use at first and then to acquire the terminal information, get the app password input for check, request terminal registration, receive the one-time app ID, a primary decryption check code, and a secondary decryption check code as a response from the authentication proxy server 200, and store the one-time app ID, the primary decryption check code, and the secondary decryption check code in a private area 111.

The terminal information may include at least a terminal identification number and the phone number of the mobile terminal 100, and the terminal information registration unit 206 may include: a means configured to determine whether there is an application for use of the authentication app 110 by referring to the terminal information table 291 with the received phone number and app password, issue an initial one-time app ID when an application is valid, acquire a user ID by referring to a user information table 293 with the received phone number, and register the terminal by updating the terminal information table 291 with the terminal identification number, the user ID, and the one-time app ID; and a means configured to respond to the mobile terminal 100 which has requested terminal registration with the one-time app ID and content of the primary and secondary decryption check codes 202 after registration of the terminal information.

The private area 111 may be a dedicated area in which only the authentication app 110 is authorized to read and write, and at least the one-time app ID, the primary decryption check code, and the secondary decryption check code are stored, and when the app is removed or reinstalled (repackaged), data stored in the private area 111 may be deleted.

The authentication app 110 installed on the mobile terminal 100 may include: a netkey receiving unit 112 configured to receive a parameter composed of a header portion and a data portion when the app is executed and determine whether the parameter has consistency; an encryption and authentication request unit 113 configured to generate and encrypt authentication request data and request authentication; an authentication result receiving unit 114 configured to receive at least a result code, a user name, a website name, and an encrypted new app ID; a one-time app ID update unit 115 configured to decrypt the encrypted new app ID and update the private area 111 with the decrypted new app ID; and an authentication result display unit 116 configured to generate and display a message including the user name and the website name according to the result code. The authentication proxy server 200 may further include: a decryption and authentication proxy unit 210 configured to decrypt encrypted authentication request data and perform authentication by proxy in response to an authentication request from the mobile terminal 100; a token relay unit 220 configured to relay at least a user ID and a token to a service server 300 and receive a result code; a relay log recording unit 230 configured to record details of the token relayed for preventing repudiation; a one-time app ID issuing unit 240 configured to issue and update a new one-time app ID; and an authentication result transmitting unit 250 configured to generate authentication result data and respond to the authentication request with the authentication result data.

The encryption and authentication request unit 113 may include: an information acquisition means configured to acquire a terminal identification number, acquire the one-time app ID, the primary decryption check code, and the secondary decryption check code from the private area 111, acquire an app version of the authentication app 110, and receive the key input of the app password; a primary encryption means configured to attach the secondary decryption check code to the data portion of the parameter and encrypt the data portion by using the app password as an encryption key; a secondary encryption means configured to attach the primary decryption check code and the app version to the primarily encrypted data and encrypt the primarily encrypted data by using the one-time app ID as an encryption key; and a data generation means configured to generate the authentication request data by attaching the terminal identification number to the secondarily encrypted data, and the encryption and authentication request unit 113 may request the authentication proxy server 200 to authenticate the generated authentication request data.

The decryption and authentication proxy unit 210 may include: a means for authenticating a device of the mobile terminal 100 and configured to extract a terminal identification number and encrypted data from the received authentication request data and acquire the user ID, the one-time app ID, and the app password by using the terminal identification number as a key and referring to the terminal information table 291; an app authentication means configured to primarily decrypt the encrypted data by using the one-time app ID as a decryption key, extract the primary decryption check code from the primarily decrypted data, and detect whether the app has been tampered and then reinstalled (repackaged) by determining whether the extracted primary decryption check code coincides with a primary decryption check code in a memory; an app version identification means configured to extract an app version from the primarily decrypted data and determine whether the extracted app version coincides with an app version in the memory; an app password authentication means configured to extract encrypted data from the primarily decrypted data, secondarily decrypt the encrypted data by using the app password as a decryption key, extract the secondary decryption check code from the secondarily decrypted data, and check password coincidence based on whether the extracted secondary decryption check code coincides with a secondary decryption check code in the memory; a website authentication means configured to extract an affiliated store ID from the secondarily decrypted data and acquire a uniform resource locator (URL) of the service server 300, an affiliated store name, an age limit for access, and an encryption key for access by using the extracted affiliated store ID as a key and referring to an affiliated store information table 292; and an age limit authentication means configured to extract an age limit from the secondarily decrypted data, acquire a user name and a birthdate by referring to a user information table 293 with the user ID, calculate an age of a user of the mobile terminal 100 by comparing a date of the system and the birthdate, and limit access to a website when the age is under the age limit or the age limit for access.

The relay log recording unit 230 may set a token issuer ID in a relay log table 294 to an affiliated store ID for specifying the service server 300 which has issued the token, set a processed token to the token, set an authentication result to the result code received from the service server 300, set a user ID to the user ID of the mobile terminal 100, set a token processing time stamp to a system time of the authentication proxy server 200, and register the set data such that data tracking is possible and repudiation of an authentication result can be prevented when an authentication-related conflict occurs.

Another aspect of the present invention provides an authentication method implemented in a two-channel authentication proxy system, the method including: a parameter check step (S100) in which an authentication app 110 checks whether there is each item of a parameter composed of a header portion and a data portion and consistency of the parameter; a step (S102) of acquiring an access URL of an authentication proxy server 200 related to an identification code of the header portion; an information acquisition step (S103) of collecting data including a one-time app ID and required for an authentication request; a step (S104) of receiving a key input of an app password which will be used as an encryption key; a data generation and encryption step (S105) of generating and encrypting authentication request data which will be transmitted to the authentication proxy server 200; an authentication request step (S106) of accessing the acquired URL, transmitting the authentication request data, and receiving authentication result data; a step (S107) of extracting encrypted data from the authentication result data, and updating a private area 111 with data obtained by decrypting the encrypted data with the one-time app ID as a new one-time app ID; an authentication success display step (S108) of extracting a result code, a user name, and a website name from the authentication result data, and generating and displaying a message including the user name and the website name according to the result code; and an authentication failure display step (S109) of displaying a failure message when an error occurs during execution of the app.

The information acquisition step (S103) may include acquiring terminal information (a terminal identification number and a phone number) and an app version, acquire the one-time app ID, a primary decryption check code, and a secondary decryption check code from the private area 111, and when acquisition of an app ID fails, determining that the authentication app 110 has been reinstalled (repackaged) and displaying an error.

The data generation and encryption step (S105) may include: a primary encryption step of attaching a secondary decryption check code to the data portion of the parameter and encrypting the data portion by using the app password as an encryption key; a secondary encryption step of attaching a primary decryption check code and an app version to the primarily encrypted data and encrypting the primarily encrypted data by using the one-time app ID as an encryption key; and generating authentication request data by attaching a terminal identification number to the secondarily encrypted data, wherein the one-time app ID and the app password may be used as encryption keys of symmetric-key cryptography such that the one-time app ID and the app password may be indirectly transmitted.

The authentication result data may include at least an authentication result code, the user name of a user of a mobile terminal 100, the website name of a service server 300 registered with the authentication proxy server 200, and a new app ID which is encrypted by using the one-time app ID as an encryption key.

Still another aspect of the present invention provides an authentication method implemented in a two-channel authentication proxy system in which latest version information of an authentication app 110 and primary and secondary decryption check code information is loaded into a memory of an authentication proxy server 200 upon start of the system, the method including: an authentication request reception step (S200) of receiving authentication request data due to access of a mobile terminal 100; a mobile terminal authentication step (S201) of extracting a terminal identification number and encrypted data from the authentication request data and acquiring a user ID, a one-time app ID, and an app password by using the terminal identification number as a key and referring to a terminal information table 291; a primary decryption and app authentication step (S202) of acquiring primarily decrypted data and performing app authentication; a secondary decryption and authentication proxy step (S203) of acquiring secondarily decrypted data and performing authentication by proxy; a token relay step (S204) of encrypting at least the authenticated user ID and a token with an encryption key for access, relaying the encrypted user ID and token to a service server 300, and receiving a relay result including an authentication result code; a token relay log recording step (S205) of recording details of the relayed token to prevent repudiation; a one-time app ID update step (S206) of issuing a new app ID for the authentication app 110 and updating the terminal information table 291 with the new app ID by using the terminal identification number as a key; an authentication-success response transmission step (S207) of generating authentication result data and responding with the authentication result data; and an authentication-failure response transmission step (S208) when an error occurs during authentication processing.

The primary decryption and app authentication step (S202) may include: an app authentication step of primarily decrypting the encrypted data by using the one-time app ID as a decryption key, extracting a primary decryption check code from the primarily decrypted data, detecting whether the authentication app 110 installed on the mobile terminal 100 has been tampered and then reinstalled (repackaged) based on whether the extracted primary decryption check code coincides with a primary decryption check code in the memory; and a step of extracting an app version from the primarily decrypted data and checking a latest version of the authentication app 110 based on whether the extracted app version coincides with an app version in the memory.

The secondary decryption and authentication proxy step (S203) may include: an app password authentication step of extracting the encrypted data from the primarily decrypted data, secondarily decrypting the encrypted data by using the app password as a decryption key, extracting the secondary decryption check code from the secondarily decrypted data, and checking password coincidence based on whether the extracted secondary decryption check code coincides with a secondary decryption check code in the memory; a website authentication step of determining whether an authentication proxy service contract has been made for a website; and an age authentication step of determining whether an age of a user of the mobile terminal 100 is appropriate for an age limit of the service server 300.

The website authentication step may include: extracting an affiliated store ID from the secondarily decrypted data, acquiring a URL, an affiliated store name, an age limit for access, and the encryption key for access by using the extracted affiliated store ID as a key and referring to an affiliated store information table 292, and determining whether an authentication proxy service contract has been made for the website.

The age authentication step may include: extracting an age limit from the secondarily decrypted data and acquiring a user name and a birthdate by referring to a user information table 293 with the user ID; calculating an age of the user of the mobile terminal 100 by comparing a date of the system and the birthdate; and determining that age authentication has failed when the calculated age is under the age limit or an age limit for access.

The token relay log recording step (S205) may include setting a token issuer ID to an affiliated store ID of the secondarily decrypted data, setting a processed token to the token of the secondarily decrypted data, setting an authentication result to the authentication result code received from the service server 300 as a token relay result, setting a user ID to the user ID of the mobile terminal 100, setting a token processing time stamp to a system time of the authentication proxy server 200, and registering the set data in a relay log table 294 such that data tracking is possible and repudiation of an authentication result can be prevented when an authentication-related conflict occurs.

The authentication-success response transmission step (S207) may include encrypting the new app ID by using the app ID as an encryption key, generating the authentication result data including at least the authentication result code received from the service server 300, a user name, an affiliated store name, and the encrypted new app ID, and responding to the mobile terminal 100 with the authentication result data.

Yet another aspect of the present invention provides a recording medium in which a program for a mobile terminal 100 to perform a two-channel authentication proxy method for detecting app tampering is recorded to be read by a control unit of the mobile terminal 100.

Advantageous Effects

Even when an attacker having a malicious purpose succeeds in collecting an application (app) source and device information and authentication information required for authentication, the present invention makes it impossible to use the collected information for authentication. Therefore, it is possible to fundamentally prevent damage which may result from carelessness of a user and to suppress an attempt to distribute a malicious app which is created for a malicious purpose.

According to the present invention, it is possible to fundamentally block keyboard hacking and screen hacking through two-channel authentication using a mobile terminal and also to prevent damage, which results from a user's careless access to a fake website for pharming/phishing, through website authentication.

When the present invention is used, it is possible to fundamentally prevent a user whose age is under an age limit of a website from joining and logging into (being authenticated for) the website.

A reliable third-party organization performs authentication by proxy, keeps authentication records, and ensures authentication, thereby replacing an authentication certificate.

DESCRIPTION OF DRAWINGS

FIG. 9 is a data format of an authentication result with which the authentication proxy server 200 responds to the mobile terminal 100.

FIG. 11 shows example data of terminal information 291.

FIG. 12 shows example data of affiliated store information 292.

FIG. 13 shows example data of user information 293.

FIG. 14 shows example data of a repudiation-preventing relay log 294.

MODES OF THE INVENTION

Objects and effects of the present invention and technical configurations to accomplish them will become apparent with reference to embodiments described in detail below and the accompanying drawings.

In the following description, detailed descriptions of known functions or configurations will be omitted when it is determined that the detailed descriptions may unnecessarily obscure the gist of the present invention. The terms described below are defined in consideration of their functionality in the present invention and may vary depending on an intention of a user or an operator, a usual practice, or the like.

However, the present invention is not limited by embodiments set forth below and may be implemented in various different forms. The present embodiments are provided to merely make the disclosure of the present invention complete and to fully describe the scope of the present invention to those of ordinary skill in the technical field to which the present invention pertains, and the present invention is merely defined by the scope of the claims.

Therefore, the definition of the scope should be made based on the entire content of the present specification.

The technical spirit of the present invention lies in registering a mobile terminal 100 for authentication with an authentication proxy server 200, and giving a one-time application (app) identification (ID) to an app 110 installed on the registered mobile terminal 100, thus detecting reinstallation (repackaging) after device duplication or app tampering of a mobile terminal, which may occur after initial registration of the mobile terminal, blocking a minor's access to a harmful website by checking an age of a mobile terminal user, and preventing phishing/pharming damage through web site authentication. Hereinafter, exemplary embodiments of the present invention will be described with reference to the drawings.

Figure 1:
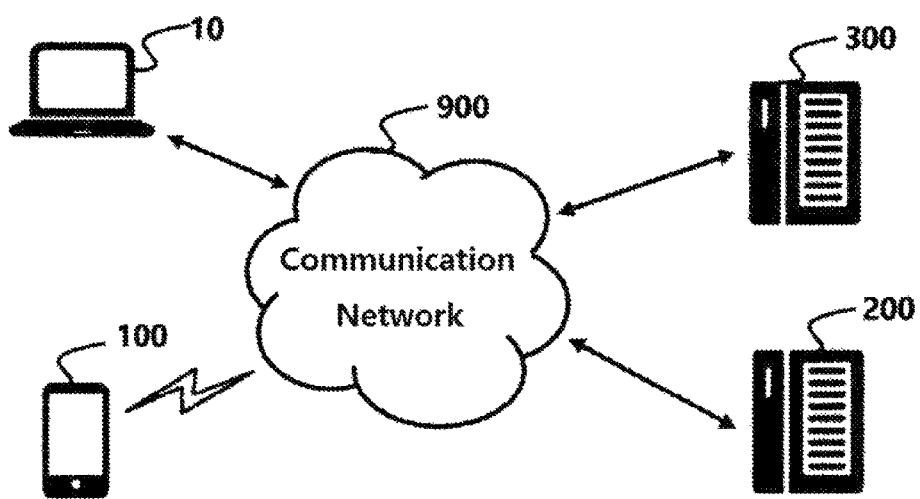
FIG. 1 is a diagram showing a two-channel authentication proxy system according to an exemplary embodiment of the present invention.

FIG. 1 is a diagram showing a configuration of a two-channel authentication proxy system according to an exemplary embodiment of the present invention.

As shown in FIG. 1, the two-channel authentication proxy system may include a client terminal 10, a mobile terminal 100, an authentication proxy server 200, a service server 300, and the like.

The client terminal 10 may be a well-known personal computer (PC), a tablet PC, and a smart television (TV) (a digital TV capable of bidirectional communication), or a payment and financial terminal, such as a point-of-sale (POS) terminal, an automatic teller machine (ATM), and the like. Also, the client terminal 10 may be a terminal, such as a vending machine, a taxi payment device, etc., which may communicate with the service server 300 by wire or wirelessly through a communication network 900 and receive a netkey, or may be an online or offline window terminal of the authentication proxy server of the present exemplary embodiment.

When the mobile terminal 100 accesses a mobile webpage of the service server 300, the mobile terminal 100 may be a client terminal of the service server 300.

The mobile terminal 100 is a well-known mobile phone or smart phone. An app 110 for transferring a netkey to the authentication proxy server 200 is provided in the mobile terminal 100, and a camera is attached to the mobile terminal 100 to scan a quick response (QR) code (a two-dimensional code) and receive a netkey, or the mobile terminal 100 has a netkey receiving app which has a near field communication (NFC) function to receive a netkey when the mobile terminal 100 comes close to an NFC tag or a terminal transmitting data through NFC.

The mobile terminal 100 may download the netkey receiving app and a netkey transfer app (will be referred to as the authentication app 110 below) from the App Store of Apple Inc., the Play Store of Google LLC, or another store for registering and managing apps and have the downloaded apps installed. Alternatively, the mobile terminal 100 may be launched with the netkey receiving app and the authentication app 110 installed thereon by a terminal manufacturing company, but the present invention is not limited thereto.

According to an exemplary embodiment, the mobile terminal 100 may execute a mobile web browser, access the mobile webpage of the service server 300 via the communication network 900, receive data including a netkey, call and execute the authentication app 110, and transfer authentication request data including the netkey to the authentication proxy server 200.

According to another exemplary embodiment, the mobile terminal 100 may execute the netkey receiving app, receive data including a netkey by scanning an image of a QR code displayed in a client terminal, call and execute the authentication app 110, and transfer authentication request data including the netkey to the authentication proxy server 200.

According to another exemplary embodiment, the mobile terminal 100 may execute the netkey receiving app, access an NFC tag or a terminal which transmits data through NFC, receive data including a netkey, call and execute the authentication app 110, and transfer authentication request data including the netkey to the authentication proxy server 200.

The authentication app 110 is executed by the netkey receiving app or a mobile web browser app, and received parameter data is data having an agreed format including a netkey (see FIG. 7) and includes a header portion and a data portion.

The authentication app 110 acquires a uniform resource locator (URL) of the authentication proxy server 200 related to an identification code of the header portion from a URL list (in the form of a file, a database (DB), or a fixed URL) attached to the app, generates authentication request data including a terminal identification number and a netkey, and transfers the authentication request data to the authentication proxy server 200.

When the mobile terminal 100 has a biometric authentication (fingerprint, vein, iris, etc.) means, biometric information of a user of the mobile terminal 100 may be acquired and converted partially or fully and uniformly, and the converted biometric information may be used instead of a password.

The mobile terminal 100 may include a well-known storage device. The storage device may be a read only memory (ROM), a universal subscriber identity module (USIM), and a non-volatile mobile memory and is a recording medium in which an operating system (OS) of the mobile terminal, an app that is an exemplary embodiment of the present invention, various apps, files subordinate to the apps, a DB, and a private area for apps are stored.

The terminal identification number is a number for uniquely identifying the mobile terminal 100 and may be an international mobile equipment identify (IMEI), a mobile subscriber international integrated services digital network (ISDN) number (MSISDN), a phone number, or the like. In the case of a mobile OS whose terminal identification information cannot be acquired, a phone number which has been input for initial terminal registration and a universally unique identifier (UUID) are issued and stored in a keychain, and the information may be acquired and used as a replacement for terminal identification.

The authentication proxy server 200 may be a server connected to a mobile communication service company which keeps subscriber information and payment information of mobile terminals, a server connected to a financial company, in which an account has been made and thus personal information is held, after personal verification, or a server connected to an organization, which holds personal information, after personal verification. An exemplary embodiment of the present invention is a server connected to a mobile communication service company but is not limited thereto.

The authentication proxy server 200 may hold subscriber information of N (N≥1) subscribers who use mobile terminals 100 and affiliated store information of N (N≥1) service servers 300 for which an authentication proxy service contract has been made, or may be connected to the information.

Since the authentication proxy server 200 specifies an individual by using subscriber information and terminal information of a mobile terminal 100 which accesses the authentication proxy server 200 via the communication network 900, performs authentication by proxy, and relays at least a token and an authenticated user ID to an associated service server 300 among N (N≥1) service servers, a user needs not provide each piece of authentication information (an ID/a password) to the service server.

Since the service server 300 has information on members who have joined the service server 300 by using user IDs generated by the authentication proxy server 200 as netkeys, the authentication proxy server 200 can authenticate the members, and the service server 300 can authenticate the members with authenticated user IDs relayed together with tokens. Also, the service server 300 has information including server IDs, Internet protocol (IP) addresses, decryption keys, etc. of the N (N≥1) authentication proxy servers for which the authentication proxy service contract has been made.

The service server 300 includes at least a token issuing unit which issues and registers a token at a request from a client terminal, a token retrieving and processing unit which retrieves and processes the token by connecting the mobile terminal 100 and the authentication proxy server 200, and a token processing monitoring unit which monitors token processing and asynchronously notifies the client terminal that the token has been processed when the token is processed. When a token is initially issued, a time at which a token has been issued and a use (joining, login, or payment) of the token may be stored as token information by using a unique token as a key. When the token is retrieved and processed, a user ID whose token has been processed and a time at which the token has been processed are updated. When an automatic screen switch request is received from the client terminal by using the processed token as a parameter, authentication is performed with the user ID whose token has been processed to automatically switch a screen of the terminal, and the token information is updated with a time at which the screen has been switched, thereby preventing a replay attack which is an attempt of fraud authentication made by another terminal transmitting the same token.

When the client terminal 10 or the mobile terminal 100 accesses the service server 300 by wire or wirelessly via the communication network 900 and requests a netkey, the service server 300 responds to the netkey request by issuing a token. When the service server 300 connects the mobile terminal 100 and the authentication proxy server 200 and retrieves the token, the service server 300 checks an access path of the authentication proxy server 200 which has relayed the token, decrypts encrypted data, checks validity of the token, and performs retrieval processing on the token according to a purpose of the issued token.

The communication network 900 is a wired or wireless communication network and denotes an IP network, a third generation (3G) network, a fourth generation (4G) network, or a network in which data transmission and reception is possible according to next-generation mobile communication in the future. The communication network 900 is a broad concept encompassing existing IP networks, dedicated lines, and virtual private network (VPN) lines.

Figure 2:
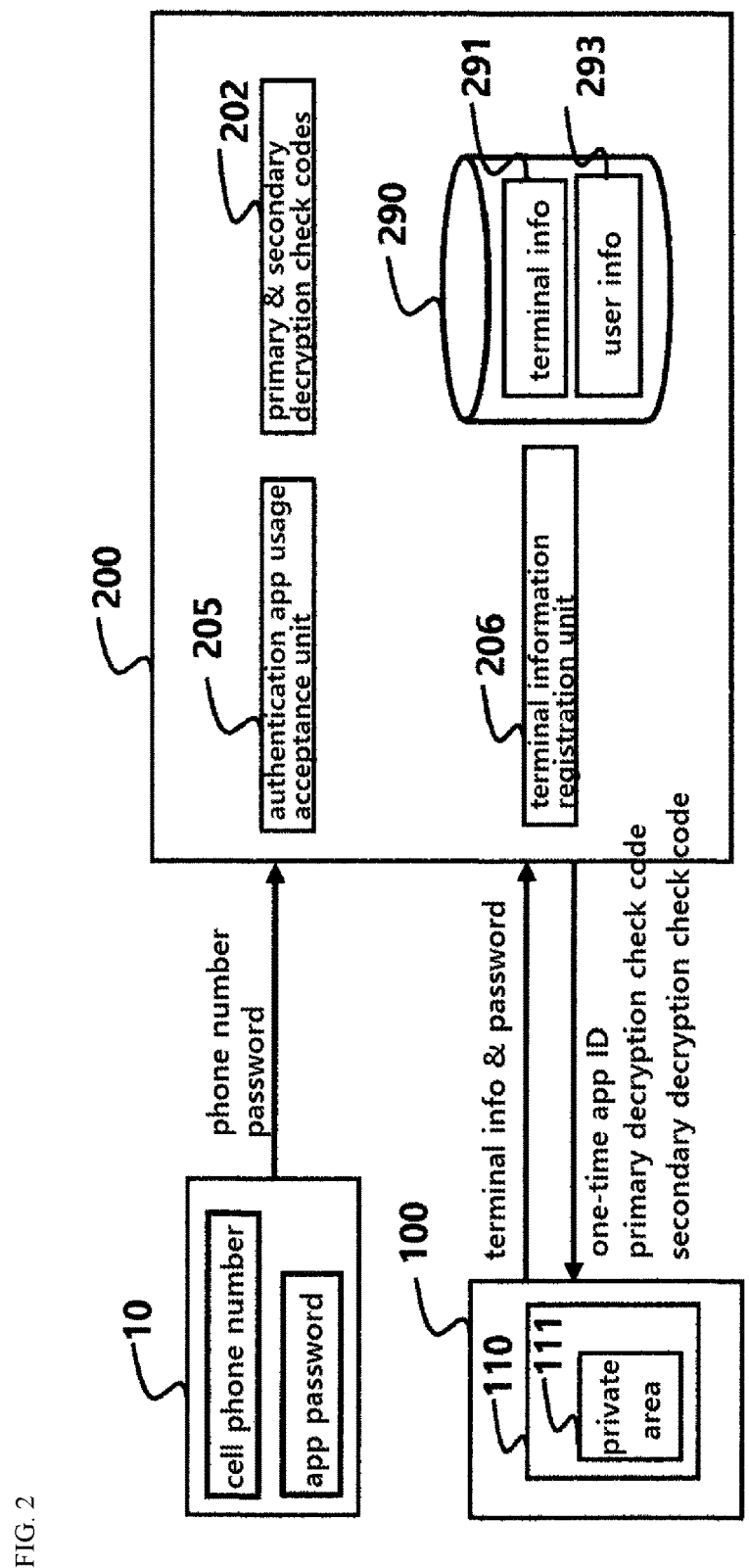
FIG. 2 is a block diagram showing a procedure of registering a device and an authentication application (app) 110 of a mobile terminal 100 with an authentication proxy server 200 according to an exemplary embodiment of the present invention.

FIG. 2 is a block diagram showing a procedure of registering a device and the authentication app 110 of the mobile terminal 100 with the authentication proxy server 200 according to an exemplary embodiment of the present invention.

In FIG. 2, the authentication proxy server 200 has a user information table 293 in which information on mobile terminal subscribers is registered. To use the authentication app 110, a user having the mobile terminal 100 may undergo a personal verification procedure at an online or offline window of the authentication proxy server 200 and then apply, from the client terminal 10 at the window, for use of the authentication app 110 by making key inputs of a phone number of the mobile terminal 100 and an app password for check.

An authentication app usage acceptance unit 205 of the authentication proxy server 200 may store the received phone number of the mobile terminal 100 and the received app password in a terminal information table 291.

The authentication app 110 installed on the mobile terminal 100 may be run by the user, and an agreement for use may be made once at first. The authentication app 110 may receive a key input of the app password which has been registered during application for app use, acquire terminal information (at least a terminal identification number and a phone number), and request terminal registration by transmitting the acquired terminal information to the authentication proxy server 200.

When the mobile terminal 100 has a biometric authentication (fingerprint, vein, iris, etc.) means, biometric information of the user of the mobile terminal 100 may be acquired and converted partially or fully and uniformly, and the converted biometric information may be registered and used instead of an app password.

In the case of a mobile OS whose terminal identification information cannot be acquired, it is possible to receive a key input of a phone number, issue a UUID, store the phone number and the UUID in a keychain, and use the stored information as terminal information.

The authentication proxy server 200 which receives the terminal registration request refers to the terminal information table 291 with the phone number and the app password received from a terminal information registration unit 206 and determines whether there is an application for use of the authentication app 110. When an application is valid, the authentication proxy server 200 issues an initial one-time app ID, acquires a user ID by referring to the user information table 293 with the received phone number, and registers the terminal by updating the terminal information table 291 with the terminal identification number, the user ID, and the one-time app ID.

After the terminal information is registered, it is possible to respond to the mobile terminal 100 which has requested terminal registration with the one-time app ID and content of (primary and secondary) decryption check codes 202.

The authentication app 110 installed on the mobile terminal 100 may receive the one-time app ID, the primary decryption check code, and the secondary decryption check code as a response to the terminal registration request and store the received data in a private area 111 in which only the authentication app 110 is authorized to read and write.

Figure 3:
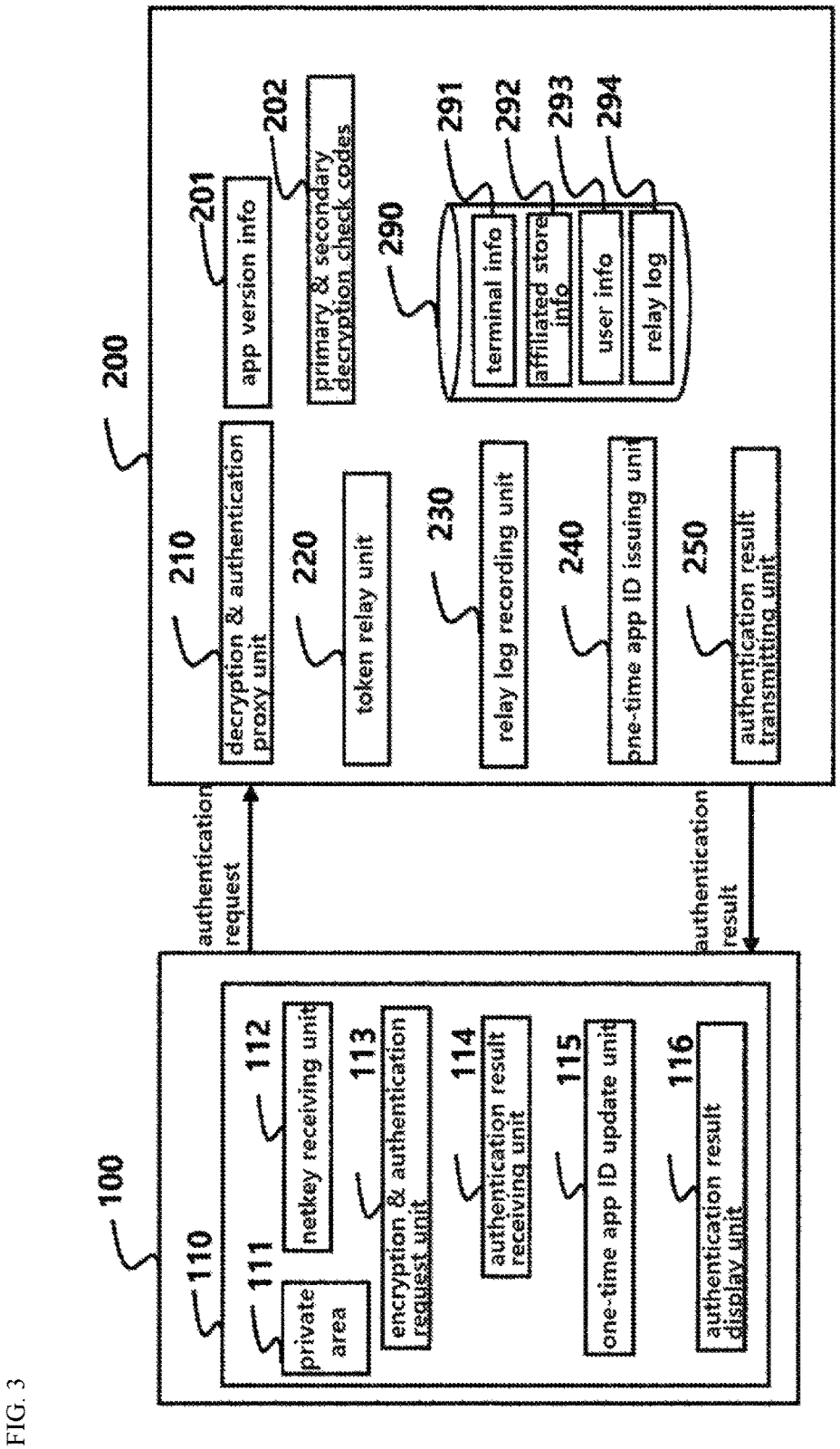
FIG. 3 is a block diagram showing a configuration of an authentication proxy system for detecting app tampering according to an exemplary embodiment of the present invention.

FIG. 3 is a block diagram showing a configuration of an authentication proxy system for detecting app tampering according to an exemplary embodiment of the present invention.

The authentication app 110 of the mobile terminal 100 is executed by a netkey receiving app or a mobile web browser app and may include the private area 111 which can be accessed by only the authentication app 110, a netkey receiving unit 112, an encryption and authentication request unit 113, an authentication result receiving unit 114, a one-time app ID update unit 115, and an authentication result display unit 116.

In the private area 111, a one-time app ID, a primary decryption check code, and a secondary decryption check code are stored due to application for use of the authentication app 110 and registration of the authentication app 110. Since data stored in the private area 111 is deleted when the app is removed or tampered and then reinstalled (repackaged), the authentication proxy server 200 which manages the one-time app ID can detect tampering of the authentication app 110.

Figure 7:
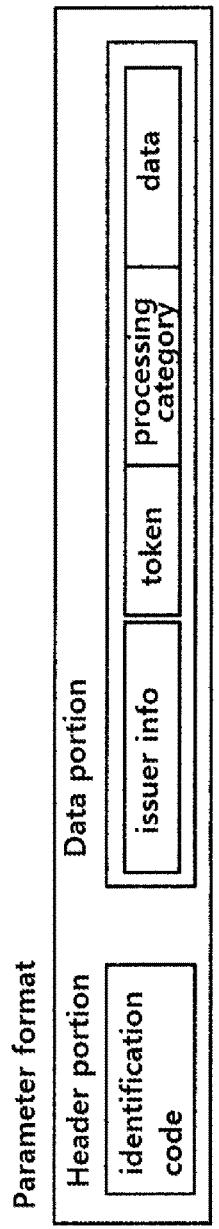
FIG. 7 shows a format of a parameter received when the authentication app 110 of the mobile terminal 100 is executed.

The netkey receiving unit 112 compares parameter data which is received by the authentication app 110 upon execution with the format of FIG. 7 to check whether each item of a header portion and a data portion exists, the size of each item, etc., acquires a URL of the authentication proxy server 200 related to an identification code of the header portion, and receives a key input of an app password.

The encryption and authentication request unit 113 acquires a terminal identification number, acquires the one-time app ID, the primary decryption check code, and the secondary decryption check code from the private area 111, acquires an app version of the authentication app 110, attaches the secondary decryption check code to the data portion of the parameter, primarily encrypts the data portion in a symmetric key method by using the app password as an encryption key, attaches the primary decryption check code and the app version to the primarily encrypted data, secondarily encrypts the primarily encrypted data in the symmetric key method by using the one-time app ID as an encryption key, generates authentication request data (see FIG. 8) by attaching the terminal identification number to the secondarily encrypted data, and requests authentication from the authentication proxy server 200.

The authentication result receiving unit 114 receives authentication result data (see FIG. 9) from the authentication proxy server 200 as a response to the authentication request.

The one-time app ID update unit 115 decrypts symmetric-key encrypted data in the authentication result data by using the one-time app ID as a decryption key and updates the private area 111 with the decrypted data by using a new app ID.

Figure 10:
FIG. 10 shows a screen of the mobile terminal 100 which displays an authentication result.
Figure 10:
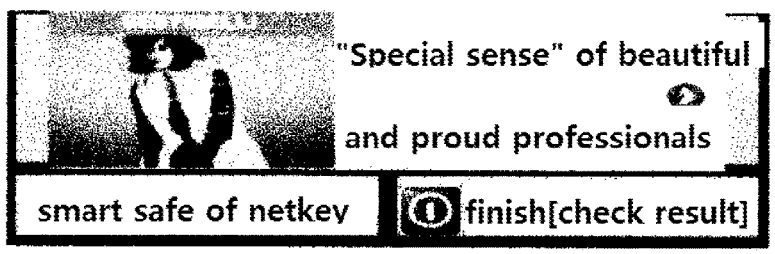

The authentication result display unit 116 generates a message including a user name and a website name according to a result code in the authentication result data and displays the message in the mobile terminal 100 (see FIG. 10).

The authentication proxy server 200 keeps latest version information of the authentication app 110 in app version information 201, and decryption check codes for checking whether decryption of encrypted data is normal are kept in the primary and secondary decryption check codes 202. The app version and the decryption check codes are loaded into a memory (RAM) together with a program when the authentication proxy server 200 is started.

The authentication proxy server 200 includes a decryption and authentication proxy unit 210, a token relay unit 220, a relay log recording unit 230, a one-time app ID issuing unit 240, and an authentication result transmitting unit 250. A DB 290 includes at least the terminal information table 291, an affiliated store information table 292, the user information table 293, and a relay log table 294, and a DB server may be configured as a separate server.

The decryption and authentication proxy unit 210 includes a means for authenticating a device of the mobile terminal 100 and which extracts the terminal identification number and the encrypted data from the received authentication request data and acquires a user ID, the one-time app ID, and the app password by using the terminal identification number as a key and referring to the terminal information table 291;

an app authentication means which primarily decrypts the encrypted data by using the one-time app ID as a decryption key, extracts the primary decryption check code from the primarily decrypted data, and detects whether the app has been tampered and then reinstalled (repackaged) by determining whether the extracted primary decryption check code coincides with a primary decryption check code in the memory;

an app version identification means which extracts the app version from the primarily decrypted data and determines whether the extracted app version coincides with an app version in the memory;

an app password authentication means which extracts the encrypted data from the primarily decrypted data, secondarily decrypts the encrypted data by using the app password as a decryption key, extracts the secondary decryption check code from the secondarily decrypted data, and checks password coincidence based on whether the extracted secondary decryption check code coincides with a secondary decryption check code in the memory;

a website authentication means which extracts an affiliated store ID from the secondarily decrypted data and acquires the URL, an affiliated store name, an age limit for access, and an encryption key for access by using the extracted affiliated store ID as a key and referring to the affiliated store information table 292; and an age limit authentication means which extracts an age limit from the secondarily decrypted data, acquires the user name and a birthdate by referring to the user information table 293 with the user ID, calculates an age of a user of the mobile terminal 100 by comparing a date of the system and the birthdate, and limits access to a website when the age is under the age limit or the age limit for access.

The token relay unit 220 may extract a token from the secondarily decrypted data, encrypt data including at least the extracted token and the user ID of the authenticated mobile terminal 100 with the encryption key for access, relay the token to the URL of the service server 300 by using the encrypted data as a parameter, and receive an authentication result including an authentication result code.

The relay log recording unit 230 is capable of tracking data when an authentication-related conflict occurs, and thus intended to prevent a person who makes an authentication request cannot deny that the authentication request has not been made by himself or herself. A reliable third-party organization performs authentication by proxy, keeps authentication records, ensures authentication, and thus may replace an authentication certificate.

As recording content, a token issuer ID is set to the affiliated store ID of the secondarily decrypted data, a processed token is set to the token in the secondarily decrypted data, an authentication result is set to the authentication result code received from the service server 300 as a token relay result, a user ID is set to the user ID of the mobile terminal 100, and a token processing time stamp is set to a system time of the authentication proxy server 200, and the set information is registered in the relay log table 294 for preventing repudiation, such that repudiation of an authentication result can be prevented.

The one-time app ID issuing unit 240 issues a new app ID for the authentication app 110 of the mobile terminal 100 and updates the terminal information table 291 with the new app ID by using the terminal identification number as a key.

The authentication result transmitting unit 250 encrypts the new app ID by using the app ID as an encryption key, generates authentication result data (see FIG. 9) including the result code received from the service server 300, the user name, and the affiliated store name, and transmits the authentication result data to the mobile terminal 100 as a response to the authentication request.

The terminal information table 291 (see FIG. 11) may include at least the terminal identification number, the phone number, the user ID, the one-time app ID, and the app password as information on the mobile terminal 100.

The affiliated store information table 292 (see FIG. 12) registers information provided by a provider of the service server 300 when a provider of the authentication proxy server contracts with the provider of the service server 300 for an authentication proxy service. The information includes at least affiliated store IDs, affiliated store names, affiliated store URLs, age limits for access, and encryption keys for access. The affiliated store IDs may be unique service provider numbers, and the age limits for access block joining and login of a user whose age is under certain ages. The encryption keys for access are symmetric-key encryption keys for encrypting data when the authentication proxy server 200 and the service server 300 exchange data and may be periodically and arbitrarily changed by the service server 300.

The user information table 293 (see FIG. 13) includes at least user IDs, user names, birthdates, and phone numbers, and the user IDs are uniquely issued by the authentication proxy server 200 and the service server 300 as IDs for specifying user of mobile terminals.

The relay log table 294 for preventing repudiation (see FIG. 14) includes at least token issuer IDs, processed tokens, authentication results, user IDs, and token processing time stamps.

Figure 4:
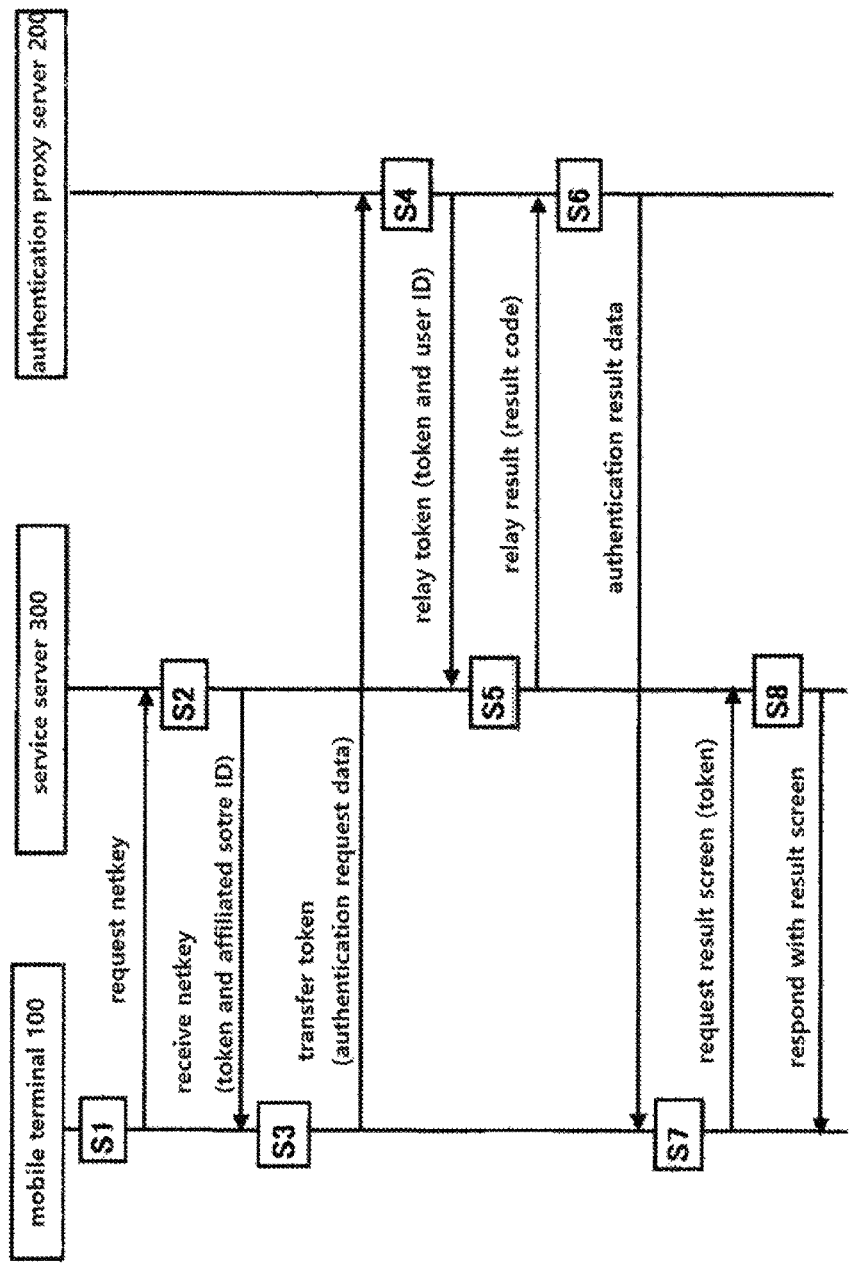
FIG. 4 is a sequence diagram showing an authentication proxy process for login authentication.

FIG. 4 is a sequence diagram showing an authentication proxy process for login authentication.

Referring to FIG. 4, the process includes a step S1 in which a user runs a mobile web browser in the mobile terminal 100, accesses a website of the service server 300, and requests a netkey for login, a token issuing step S2 in which the service server 300 receiving the request for a netkey for login issues and registers a unique token, generates data in an agreed format (see FIG. 7), and responds to the request with the generated data, a step S3 in which the mobile terminal 100 receiving the netkey receives a key input of a password by calling the authentication app 110, generates authentication request data (see FIG. 8), and requests authentication from the authentication proxy server 200 with the authentication request data, a step S4 in which the authentication proxy server 200 performs authentication of the accessing mobile terminal and user by proxy in response to the access and the authentication request of the mobile terminal 100 and relays an authenticated user ID and the token to the service server 300, a token retrieval processing step S5 in which the service server 300 retrieving the token checks an access path of the authentication proxy server 200 which has relayed the token, decrypts encrypted data, check validity of the token, performs login processing with the received user ID, and responds with an authentication result, a step S6 in which the authentication proxy server 200 receiving the authentication result records a token relay log, updates an app ID by issuing a new app ID, generates authentication result data (see FIG. 9), and responds to the authentication request of the mobile terminal 100 with the authentication result data, a step S7 in which the mobile terminal 100 receiving the authentication result updates the authentication app 110 with the new app ID, displays the authentication result (see FIG. 10), and when the user finishes the authentication app 110, returns to the web browser in which the authentication app 110 has been executed and requests a login result screen, and a step S8 in which the service server 300 checks a processing result of the received token, determines that the authentication has succeeded, and responds with a login result screen.

Figure 5:
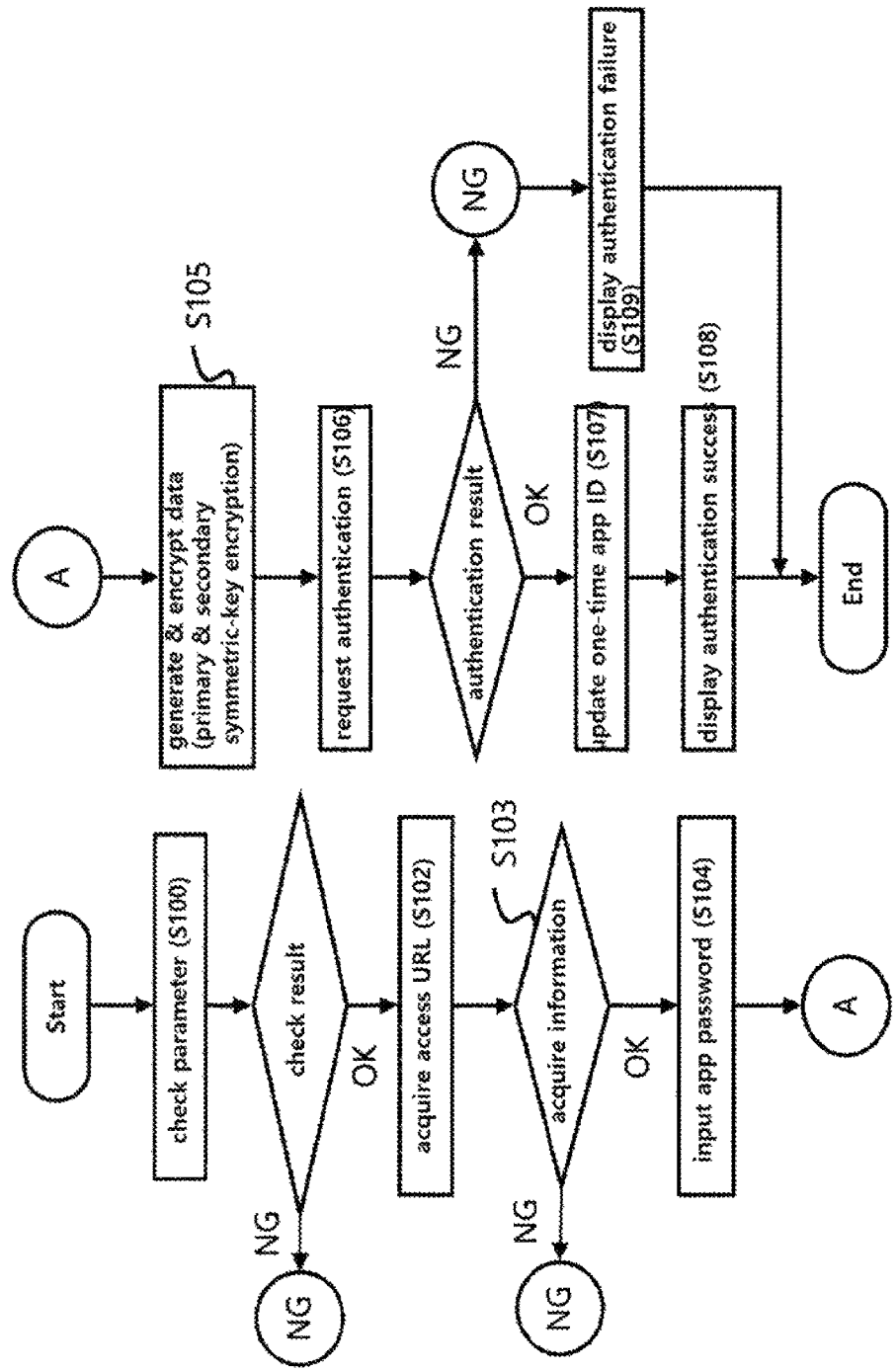
FIG. 5 is a flowchart illustrating processing of the authentication app 110 of the mobile terminal 100.

FIG. 5 is a flowchart illustrating processing of the authentication app 110 of the mobile terminal 100.

The process includes a parameter check step (S100) of comparing a parameter, which is received when the authentication app 110 is executed, with the format of FIG. 7 and checking whether each item of a header portion and a data portion exists, the size of each item, and the like; a step (S109) of displaying an error screen when a check result is no good (NG); a step (S102) of acquiring an access URL of the authentication proxy server 200 related to an identification code of the header portion when check results are normal; an information acquisition step (S103) of acquiring terminal information (a terminal identification number and a phone number) and an app version and acquiring a one-time app ID, a primary decryption check code, and a secondary decryption check code stored in the private area 111; a step (S104) of receiving a key input of an app password when the information is acquired normally; a step (S105) of attaching the secondary decryption check code to the data portion of the parameter, primarily encrypting the data portion in the symmetric key method by using the app password as an encryption key, attaching the primary decryption check code and the app version to the primarily encrypted data, secondarily encrypting the primarily encrypted data in the symmetric key method by using the one-time app ID as an encryption key, and generating authentication request data (see FIG. 8) by attaching the terminal identification number to the secondarily encrypted data; an authentication request step (S106) of requesting authentication by transmitting the authentication request data to the authentication proxy server 200, and receiving authentication result data (see FIG. 9); the step (S109) of displaying an authentication failure when the authentication result indicates a failure; a step (S107) of, when the authentication is successful, extracting the encrypted data from the authentication result data, decrypting the encrypted data by using the one-time app ID as a decryption key, and updating the private area 111 with the decrypted data as a new app ID; and an authentication success display step (S108) of extracting a result code, a user name, and a website name from the authentication result data, and generating and displaying a message including the user name and the website name according to the result code (see FIG. 10).

Figure 6:
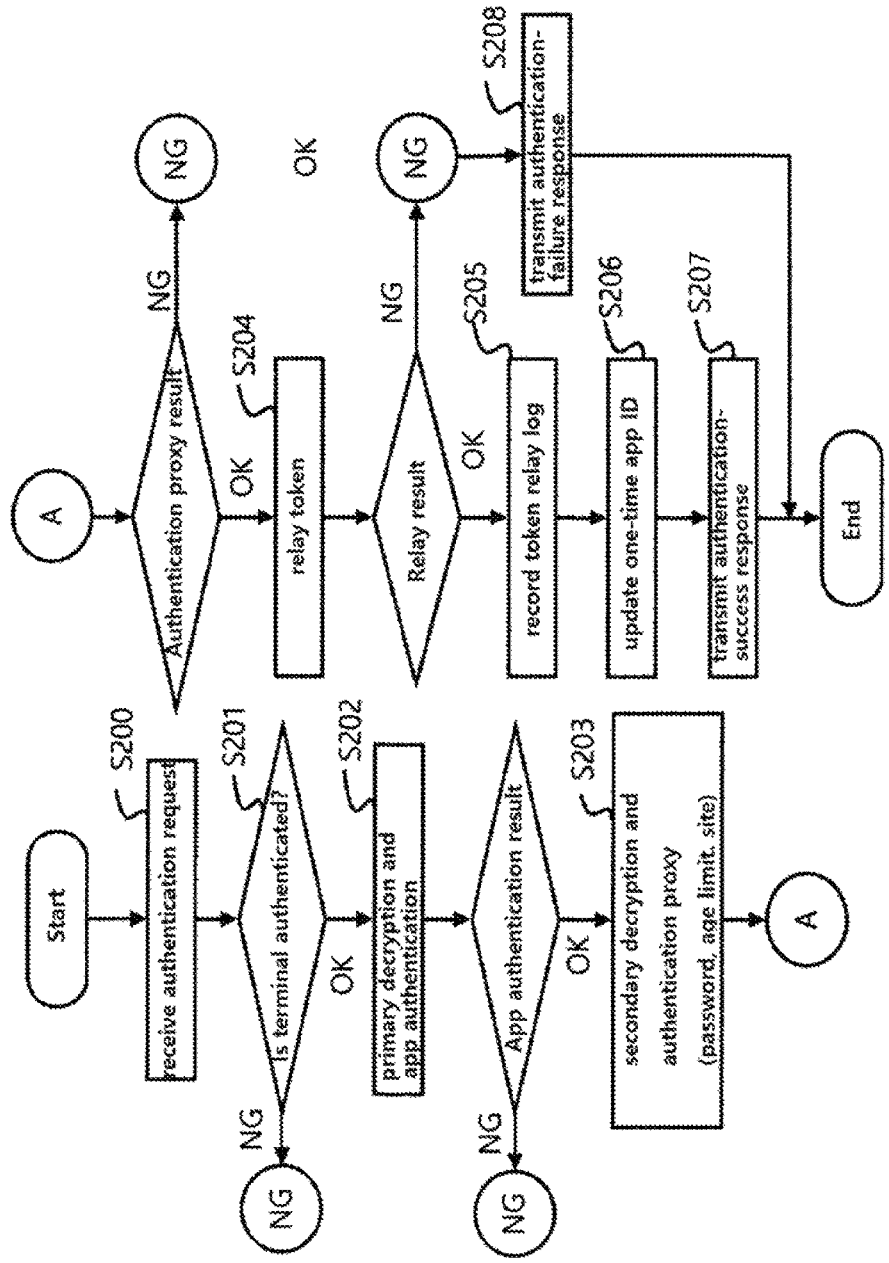
FIG. 6 is a flowchart illustrating an authentication proxy process in an authentication proxy server.

FIG. 6 is a flowchart illustrating an authentication proxy process in an authentication proxy server.

Referring to FIG. 6, the process includes a step (S200) of receiving authentication request data due to access of the mobile terminal 100; a terminal authentication step (S201) of extracting a terminal identification number and encrypted data from the authentication request data and acquiring a user ID, a one-time app ID, and an app password by using the terminal identification number as a key and referring to the terminal information table 291;

a step (S202) including a step of processing a step S208 when the terminal authentication fails, an app authentication step of, when the terminal authentication succeeds, primarily decrypting the encrypted data by using the acquired one-time app ID as a decryption key, extracting a primary decryption check code from the primarily decrypted data, and detecting whether the authentication app 110 installed on the mobile terminal 100 has been tampered and then reinstalled (repacked) based on whether the extracted primary decryption check code coincides with a primary decryption check code in a memory, and a step of extracting an app version from the primarily decrypted data and checking a latest version of the authentication app 110 based on whether the extracted app version coincides with an app version in the memory;

a step (S203) including a step of processing the step S208 when the app authentication fails, a step of, when the app authentication succeeds, extracting the encrypted data from the primarily decrypted data and secondarily decrypting the encrypted data by using the app password as a decryption key, an app password authentication step of extracting a secondary decryption check code from the secondarily decrypted data and checking password coincidence based on whether the extracted secondary decryption check code coincides with a secondary decryption check code in the memory, a website authentication step of extracting an affiliated store ID from the secondarily decrypted data, acquiring a URL, an affiliated store name, an age limit for access, and an encryption key for access by using the extracted affiliated store ID as a key and referring to the affiliated store information table 292, and determining whether a website has been registered, and an age limit authentication step of extracting an age limit from the secondarily decrypted data, acquiring a user name and a birthdate by referring to the user information table 293 with the user ID, calculating an age of the user of the mobile terminal 100 by comparing the birthdate with a date of the system, and limiting authentication of the web site when the age is under the age limit or the age limit for access;

a step (S204) of processing the step S208 when the authentication result indicates a failure, and extracting, when the authentication result is successful, a token from the secondarily decrypted data, generating token relay data including at least the user ID and the token, encrypting the token relay data with the encryption key for access, relaying the token to the URL of the service server 300, and receiving a relay result;

a step (S205) of processing the step S208 when the relay result is an authentication failure, and setting, when the relay result is an authentication success, a token issuer ID to the affiliated store ID of the secondarily decrypted data, setting a processed token to the token of the secondarily decrypted data, setting an authentication result to an authentication result code received from the service server 300 as the token relay result, setting a user ID to the user ID of the mobile terminal 100, setting a token processing time stamp to a system time of the authentication proxy server 200, and registering the set data in the relay log table 294 for preventing repudiation;

a step (S206) of issuing a new app ID for the authentication app 110 of the mobile terminal 100 and updating the terminal information table 291 with the new app ID by using the terminal identification number as a key;

a step (S207) of encrypting the new app ID by using the app ID as an encryption key, generating authentication result data (see FIG. 9) with the authentication result code received from the service server 300, the user name, and the affiliated store name, and responding to the mobile terminal 100 with authentication success; and the step (S208) of responding with authentication failure together with a cause of NG when NG occurs in each step.

FIG. 7 shows a format of a parameter received when the authentication app 110 of the mobile terminal 100 is executed.

Referring to FIG. 7, a header portion may include an identification code related to a website to which access will be given, and a data portion may include a netkey composed of a token and information on an issuer of the token, a processing category (code information related to one of joining, authentication, payment, transfer, and an item to be added in the future), and processing-related data which is an age limit when the processing category is joining or authentication and is amount information when the processing category is payment or transfer.

The issuer information includes at least an affiliated store ID and may further include a country code of a service provider who runs the service server 300 and a server ID of an authentication proxy server which performs authentication by proxy in the corresponding country in order to handle authentication of a foreign website.

Figure 8:
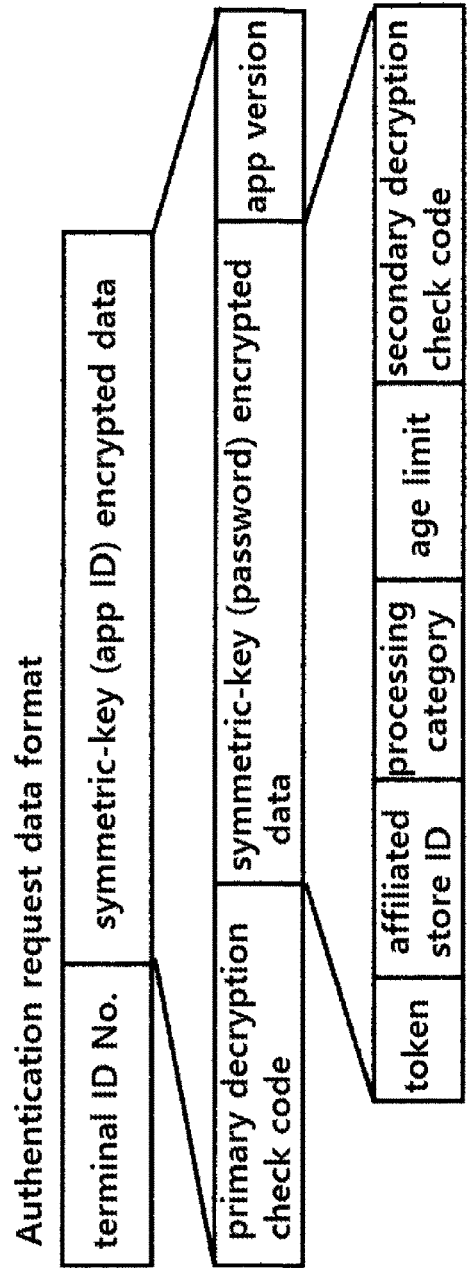
FIG. 8 is a data format with which the mobile terminal 100 requests authentication while accessing the authentication proxy server 200.

FIG. 8 is a data format with which the mobile terminal 100 requests authentication while accessing the authentication proxy server 200.

Referring to FIG. 8, an app ID and an app password are not directly included in authentication request data, and an indirect transfer method is used in which the app ID and the app password are used as encryption keys for encryption and it is determined whether the app ID and the app password coincide with those stored in a memory based on whether the authentication request data has been decrypted normally.

FIG. 9 is a data format of an authentication result with which the authentication proxy server 200 responds to the mobile terminal 100.

FIG. 10 shows a screen of a mobile terminal which displays an authentication result.

Referring to FIG. 10, the displayed screen shows a name of a mobile terminal user and a name of web site for which authentication has succeeded, and the website name can be checked through two channels. Therefore, it is possible to stop accessing an undesired website.

FIGS. 11 to 14 show table structures and example data of the DB 290 of the authentication proxy server 200 according to an exemplary embodiment of the present invention, but the DB 290 is not limited thereto.

According to the above-described exemplary embodiments, without inputting an ID, a password, a security card, or a one-time password (OTP) which may be leaked by carelessness of a user and abused, it is possible to conveniently and safely perform authentication through an authentication proxy server and join and log into each website.

Configurations of the above-described exemplary embodiments shown in the drawings are merely examples, and the present invention is not limited thereto.

The above-described exemplary embodiments of the present invention are implemented not only through an apparatus and a method but also through a program for implementing functionality corresponding to configurations of the exemplary embodiments of the present invention or a recording medium in which the program is recorded. This can be easily implemented based on the above descriptions of the exemplary embodiments by experts of a technical field to which the present invention pertains.

Although exemplary embodiments have been described in detail above, the scope of the present invention is not limited thereto and encompasses various modifications and alterations made by those of ordinary skill in the art based on the basic concept of the present invention.

The service server 300 and the authentication proxy server 200 for implementing the present invention are common server devices including a storage unit, an input unit, a control unit, and a communication unit. The service server 300 and the authentication proxy server 200 may have a web server and a DB server, and the DB server may be installed in the same server device or a separate server device.

The present invention can be also implemented as a computer-readable code in a computer-readable recording medium. The computer-readable recording medium includes any kind of recording devices in which data that can be read by a computer system is stored.

The aforementioned token is issued by a service server, and the service server may set a unique identifier to a valid time. The token is valid when it is retrieved and processed within the set valid time by the service server which has issued the token, fundamentally preventing a man-in-the-middle (MITM) attack and a replay attack in a network.

The aforementioned netkey includes at least a one-time token and identification information (an affiliated store ID) of an issuer which has issued the token.

The terms including token, netkey, and authentication proxy server are defined in consideration of their functionality in the present invention and may vary depending on an intention of a user or an operator, a usual practice, or the like. Therefore, definitions thereof should be made based on the entire content of the present specification.

INDUSTRIAL APPLICABILITY

The present invention provides a two-channel authentication proxy system for detecting application (app) tampering when a tampered authentication app is reinstalled (re-packaged).

The invention claimed is:

1. A two-channel authentication proxy system for detecting application (app) tampering, the system comprising:
   a client terminal and a mobile terminal being communicated with an authentication proxy server via a communication network and the client terminal, the mobile terminal, and the authentication proxy server being communicated with a service server via the communication network to register a device and an authentication app of the mobile terminal after an authentication with the authentication proxy server;
   the client terminal being configured to receive key inputs of a phone number of the mobile terminal and an app password for checking and apply for use of the authentication app to the authentication proxy server by using the key inputs of the phone number and the app password;
   the authentication proxy server including a processor and one or more units, which when executed by the processor, perform the following, the one or more units comprising:
   an authentication app usage acceptance unit, executed by the processor, configured to register information including at least the phone number of the mobile terminal and the app password in a terminal information table in response to receipt of the application for use of the authentication app from the client terminal, wherein
   the mobile terminal includes the authentication app which being configured to be executed and approved for use, wherein
   the mobile terminal is configured to acquire the terminal information, and
   to get the app password input from a user,
   to send a request for terminal registration to the authentication proxy server with the terminal information and the app password,
   wherein the one or more units of the authentication proxy server further comprise a terminal information registration unit, executed by the processor, configured to issue a one-time app identification (ID) and register terminal information by using the issued one-time app identification (ID) in response to receipt of the terminal information and the app password from the mobile terminal when accessing the mobile terminal,
   wherein the mobile terminal is further configured to receive the one-time app ID, a primary decryption check code and a secondary decryption check code from the authentication proxy server as a response to the request for the terminal registration, and
   to store the one-time app ID, the primary decryption check code, and the secondary decryption check code in a private area, and
   wherein for a two-channel authentication, the mobile terminal is configured to send a request for netkey to a service server,
   to receive data including the netkey as a response to the request for the netkey from the service server, and
   to execute the authentication app using the received data as a parameter,
   to generate authentication request data including at least one of the netkey, the primary decryption check code and the secondary decryption check code,
   to encrypt the authentication request data using the one-time app ID as an encryption key,
   to send a request for authentication to the authentication proxy server with the encrypted authentication request data,
   to receive a new one-time app ID from the authentication proxy server as a response to the request for the authentication, and
   to store the new one-time app ID in the private area.

2. The two-channel authentication proxy system of claim 1, wherein the terminal information includes at least a terminal identification number and the phone number of the mobile terminal, and
   the terminal information registration unit is executed by the processor
   to determine whether there is an application for use of the authentication app by referring to the terminal information table with the received phone number and app password,
   to issue an initial one-time app ID when an application is valid, to acquire a user ID by referring to a user information table with the received phone number, and
   to register the terminal by updating the terminal information table with the terminal identification number, the user ID, and the one-time app ID; and
   to respond to the mobile terminal which has requested terminal registration with the one-time app ID and content of the primary and secondary decryption check codes after registration of the terminal information.

3. The two-channel authentication proxy system of claim 1, wherein the private area is a dedicated area in which only the authentication app is authorized to read and write, and at least the one-time app ID, the primary decryption check code, and the secondary decryption check code are stored, and
   in response to detection of the authentication app being removed or reinstalled, data stored in the private area is deleted.

4. The two-channel authentication proxy system of claim 1, wherein the authentication app includes:
   a net key receiving unit, executed by the processor, to receive a parameter composed of a header portion and a data portion when the app is executed, and determine whether the parameter has consistency;
   an encryption and authentication request unit, executed by the processor, to generate and encrypt the authentication request data and request authentication;
   an authentication result receiving unit, executed by the processor, to receive at least a result code, a user name, a website name, and an encrypted new one-time app ID;

a one-time app ID update unit, executed by the processor, to decrypt the encrypted new one-time app ID and to update the private area with the decrypted new one-time app ID; and an authentication result display unit, executed by the processor, to generate and display a message including the user name and the website name according to the result code.

5. The two-channel authentication proxy system of claim 1, wherein latest version information of the authentication app and the primary and secondary decryption check code information is loaded into a memory of the authentication proxy server upon start of the system, and the authentication proxy server further includes:

a decryption and authentication proxy unit, executed by the processor, to decrypt encrypted authentication request data and to perform authentication by proxy in response to receipt of an authentication request from the mobile terminal;

a token relay unit, executed by the processor, to relay at least a user ID and a token to the service server 300 and receive a result code;

a relay log recording unit, executed by the processor, to record details of the token relayed for preventing repudiation;

a one-time app ID issuing unit, executed by the processor, to issue and update a new one-time app ID; and an authentication result transmitting unit, executed by the processor; to generate authentication result data and respond to the authentication request with the authentication result data.

6. The two-channel authentication proxy system of claim 4, wherein the encryption and authentication request unit, executed by the processor, to acquire a terminal identification number, to acquire the one-time app ID, the primary decryption check code, and the secondary decryption check code from the private area, to acquire an app version of the authentication app, and to receive the key input of the app password;

to attach the secondary decryption check code to the data portion of the parameter and to encrypt the data portion by using the app password as an encryption key;

to attach the primary decryption check code and the app version to the primarily encrypted data and to encrypt the primarily encrypted data by using the one-time app ID as an encryption key; and to generate the authentication request data by attaching the terminal identification number to the secondarily encrypted data, and to request the authentication proxy server to authenticate the generated authentication request data.

7. The two-channel authentication proxy system of claim 5, wherein the decryption and authentication proxy unit executed by the processor, to authenticate a device of the mobile terminal and to extract a terminal identification number and encrypted data from the received authentication request data and to acquire the user ID, the one-time app ID, and the app password by using the terminal identification number as a key and referring to the terminal information table;

to primarily decrypt the encrypted data by using the one-time app ID as a decryption key, to extract the primary decryption check code from the primarily decrypted data, and to detect whether a tampered app has been reinstalled by determining whether the extracted primary decryption check code coincides with a primary decryption check code in the memory;

to extract an app version from the primarily decrypted data and to determine whether the extracted app version coincides with an app version in the memory;

to extract encrypted data from the primarily decrypted data, secondarily to decrypt the encrypted data by using the app password as a decryption key, to extract the secondary decryption check code from the secondarily decrypted data, and to check password coincidence based on whether the extracted secondary decryption check code coincides with a secondary decryption check code in the memory;

to extract an affiliated store ID from the secondarily decrypted data and to acquire a uniform resource locator (URL) of the service server, an affiliated store name, an age limit for access, and an encryption key for access by using the extracted affiliated store ID as a key and referring to an affiliated store information table; and to extract an age limit from the secondarily decrypted data, to acquire a user name and a birthdate by referring to a user information table with the user ID, to calculate an age of a user of the mobile terminal by comparing a date of the system and the birthdate, and to limit access to a website when the age is under the age limit or the age limit for access.

8. The two-channel authentication proxy system of claim 5, wherein the relay log recording unit, executed by the processor, to set a token issuer ID field in a relay log table to an affiliated store ID for specifying the service server which has issued the token, to set a processed token field to the token, to set an authentication result field to the result code received from the service server, to set a user ID field to the user ID of the mobile terminal, to set a token processing time stamp field to a system time of the authentication proxy server, and to register the set data such that data tracking is possible and repudiation of an authentication result is prevented when an authentication-related conflict occurs.

9. A computer-implemented two-channel authentication proxy method, in which an authentication proxy server, a service server and a mobile terminal being communicated with each other via a communication network, for detecting application (app) tampering after registering, with the authentication proxy server, a device of the mobile terminal whose identity has been verified and an authentication app installed on the mobile terminal including a hardware processor, the mobile terminal sending a request for net key to the service server for a two-channel authentication, receiving data including the net key from the service server, and executing, by the hardware processor, the authentication app using the received data as parameter composed of a header portion and a data portion, the method comprising:

determining, by the hardware processor, whether each item of the parameter exists, and checks consistency of the parameter;

acquiring, by the hardware processor, an access uniform resource locator (URL) of the authentication proxy server related to an identification code of the header portion;

collecting, by the hardware processor, data including a one-time app identification (ID) and required for an authentication request;

receiving, by the hardware processor, a key input of an app password which will be used as an encryption key from a user;

generating and encrypting, by the hardware processor, authentication request data which will be transmitted to the authentication proxy server the authentication request data being encrypted using the app password;

accessing, by the hardware processor, the acquired URL, transmitting the authentication request data, and receiving authentication result data;

extracting, by the hardware processor, encrypted data from the authentication result data, and updating a private area with data obtained by decrypting the encrypted data with the one-time app ID as a new one-time app ID;

extracting, by the hardware processor, a result code, a user name, and a website name from the authentication result data, and generating and displaying a message including the user name and the website name according to the result code.

10. The two-channel authentication proxy method of claim 9 further comprising:

acquiring terminal information and an app version, acquiring the one-time app ID, a primary decryption check code, and a secondary decryption check code from the private area, and in response to detection of acquisition of the one-time app ID being failed, determining that the authentication app having been reinstalled, and displaying an error.

11. The two-channel authentication proxy method of claim 9 further comprising:

attaching a secondary decryption check code to the data portion of the parameter and encrypting the data portion by using the app password as an encryption key;

attaching a primary decryption check code and an app version to the primarily encrypted data and encrypting the primarily encrypted data by using the one-time app ID as an encryption key; and generating authentication request data by attaching a terminal identification number to the secondarily encrypted data, wherein the one-time app ID and the app password are used as encryption keys of symmetric-key cryptography to indirectly transmit the one-time app ID and the app password.

12. The two-channel authentication proxy method of claim 9, wherein the authentication result data includes at least an authentication result code, the user name of a user of the mobile terminal, the web site name of the service server registered with the authentication proxy server, and a new one-time app ID which is encrypted by using the one-time app ID as an encryption key.

13. A computer implemented two-channel authentication proxy method for detecting application (app) tampering in the a two-channel authentication proxy system, in which latest version information of the authentication app and primary and secondary decryption check code information is loaded into a memory of the authentication proxy server which including a hardware processor upon start of the system, the method comprising:

receiving, by the hardware processor, authentication request data from the mobile terminal due to access of the mobile terminal;

extracting, by the hardware processor, a terminal identification number and encrypted data from the authentication request data and acquiring a user identification (ID), a one-time app ID, and an app password by using the terminal identification number as a key and referring to the terminal information table;

acquiring, by the hardware processor, primarily decrypted data and performing app authentication;

acquiring, by the processor, secondarily decrypted data and performing authentication by the proxy server;

encrypting, by the hardware processor, at least the authenticated user ID and a token with an encryption key for access, relaying, by the hardware processor, the encrypted user ID and token to the service server 500, and receiving, by the hardware processor, a relay result including an authentication result code from the server;

recording, by the hardware processor, details of the relayed token to prevent repudiation;

issuing, by the hardware processor, a new one-time app ID for the authentication app and updating the terminal information table with the new onetime app ID by using the terminal identification number as a key; and generating, by the hardware processor, authentication result data and responding to the mobile terminal with the authentication result data.

14. The two-channel authentication proxy method of claim 13, further comprising:

primarily decrypting the encrypted data by using the one-time app ID as a decryption key, extracting a primary decryption check code from the primarily decrypted data, detecting whether the authentication app installed on the mobile terminal having been tampered and reinstalled based on whether the extracted primary decryption check code coincides with the primary decryption check code in the memory; and extracting an app version from the primarily decrypted data and checking a latest version of the authentication app based on whether the extracted app version coincides with an app version in the memory.

15. The two-channel authentication proxy method of claim 13, further comprising:

extracting the encrypted data from the primarily decrypted data, secondarily decrypting the encrypted data by using the app password as a decryption key, extracting a secondary decryption check code from the secondarily decrypted data, and checking password coincidence based on whether the extracted secondary decryption check code coincides with the secondary decryption check code in the memory;

determining, by the processor, whether an authentication proxy service contract has been made for a website; and determining whether a user of the mobile terminal can access the service server by checking an age of the user.

16. The two-channel authentication proxy method of claim 15, further comprising:

extracting an affiliated store ID from the secondarily decrypted data, acquiring a uniform resource locator (URL) of the service server, an affiliated store name, an age limit for access, and the encryption key for access by using the extracted affiliated store ID as a key and referring to an affiliated store information table, and determining, by the processor, whether an authentication proxy service contract having been made for the web site.

17. The two-channel authentication proxy method of claim 15, further comprising:

extracting an age limit from the secondarily decrypted data and acquiring a user name and a birthdate by referring to a user information table with the user ID;

calculating an age of the user of the mobile terminal by comparing a date of the system and the birthdate; and determining, by the processor, that age authentication being failed when the calculated age is under the age limit or an age limit for access.

18. The two-channel authentication proxy method of claim 13, further comprising:

setting a token issuer ID field to an affiliated store ID of the secondarily decrypted data, setting a processed token field to the token of the secondarily decrypted data, setting an authentication result field to the authentication result code received from the service server as the token relay result, setting a user ID field to the user ID of the mobile terminal, setting a token processing time stamp field to a system time of the authentication proxy server, and registering the set data in a relay log table to prevent data tracking is possible and repudiation of an authentication result is prevented when an authentication-related conflict occurs.

19. The two-channel authentication proxy method of claim 13 further comprising:

encrypting the new one-time app ID by using the one-time app ID as an encryption key, generating the authentication result data including at least the authentication result code received from the service server, a user name, an affiliated store name, and the encrypted new one-time app ID, and responding to the mobile terminal with the authentication result data.

20. A non-transitory recording medium, which being executed by the processor of the claim 9, in which an application for performing each step of the method of claim 9 is recorded to be read by a computer system of the mobile terminal.

21. An application stored in a non-transitory recording medium of a smart phone so that a program code in which a procedure for performing each step of the method of claim 9 is loaded into and executed by a computer system of the smart phone.

* * * * *